(12) United States Patent
Nishi et al.

(10) Patent No.: US 8,606,032 B2
(45) Date of Patent: Dec. 10, 2013

(54) IMAGE PROCESSING METHOD, DEVICE AND PROGRAM TO PROCESS A MOVING IMAGE

(75) Inventors: Toru Nishi, Stuttgart (DE); Oliver Erdler, Ostfildern-Ruit (DE)

(73) Assignee: Sony Corporation, Tokyo (JP)

( * ) Notice: Subject to any disclaimer, the term of this patent is extended or adjusted under 35 U.S.C. 154(b) by 522 days.

(21) Appl. No.: 12/915,484

(22) Filed: Oct. 29, 2010

(65) Prior Publication Data

US 2011/0149163 A1 Jun. 23, 2011

(30) Foreign Application Priority Data

Dec. 23, 2009 (EP) ..................................... 09180582

(51) Int. Cl.
*G06K 9/40* (2006.01)
(52) U.S. Cl.
USPC ........... 382/255; 382/295; 382/264; 382/280; 382/279; 382/294
(58) Field of Classification Search
USPC .................. 382/255, 295, 264, 280, 279, 294
See application file for complete search history.

(56) References Cited

U.S. PATENT DOCUMENTS

| | | | | |
|---|---|---|---|---|
| 5,878,108 A * | 3/1999 | Baba et al. | ..................... | 378/98.4 |
| 5,960,058 A * | 9/1999 | Baba et al. | ..................... | 378/98.4 |
| 6,154,574 A * | 11/2000 | Paik et al. | ....................... | 382/255 |
| 7,729,750 B2 * | 6/2010 | Tromberg et al. | ............ | 600/476 |
| 8,090,212 B1 * | 1/2012 | Baxansky et al. | ............. | 382/260 |
| 8,098,948 B1 * | 1/2012 | Tzur et al. | ..................... | 382/255 |
| 2007/0070221 A1 * | 3/2007 | Nishi et al. | ..................... | 348/241 |
| 2009/0097773 A1 * | 4/2009 | Nishi et al. | ..................... | 382/264 |
| 2009/0297056 A1 * | 12/2009 | Lelescu et al. | ................ | 382/261 |
| 2011/0149163 A1 | 6/2011 | Nishi et al. | | |
| 2012/0070096 A1 * | 3/2012 | Oyama | .......................... | 382/254 |
| 2013/0170765 A1 * | 7/2013 | Santos et al. | .................. | 382/255 |

OTHER PUBLICATIONS

Medical image scatter suppression by inverse filtering, Seibert et al., SPIE, vol. 9 914, 1988, pp. 742-750.*
Medical image scatter suppression by inverse filtering, Seibert et al., SPI E, vol. 9 914, 1988, pp. 742-750.*
Richardson-Lucy algorithm—Deconvolution, Dey et al., MRAT 69, 2006, pp. 260-266.*
Restoration of out of focus—filter, Addiati et al., IEEE, 978-07695-3959-1, 2009, pp. 133-137.*
Blind Deconvolution—DST, Maki et al., IJOCSSP, Issue 1, vol. 1,2007, 2007, pp. 92-100.*
Yu-Wing Tai, et al., "Image/Video Deblurring using a Hybrid Camera." IEEE, 2008, 8 pages.
U.S. Appl. No. 13/886,807, filed May 3, 2013, Springer, et al.
U.S. Appl. No. 13/887,021, filed May 3, 2013, Springer, et al.

* cited by examiner

*Primary Examiner* — Jayesh A Patel
(74) *Attorney, Agent, or Firm* — Oblon, Spivak, McClelland, Maier & Neustadt, L.L.P.

(57) ABSTRACT

The present invention relates to an image processing method and to a device to process a moving image, which is shot by a predetermined video shooting device, in increments of access units. The imaging blur is represented by a corresponding low-pass filter showing the properties of imaging blur which occurs at the time that said moving image is shot with said video shooting device. According to the present method an inverse filter having inverse properties as to said low-pass filter is generated. A processing is performed to apply said inverse filter to said access unit to be processed. Hereby, the step of generating an inverse filter includes an iterative algorithm in the frequency domain based on the original blurred image and the point spread function.

11 Claims, 14 Drawing Sheets

IMAGE PROCESSING METHOD, DEVICE AND PROGRAM TO PROCESS A MOVING IMAGE

CROSS-REFERENCE TO RELATED APPLICATIONS

The present invention contains subject matter related to United States patent application US 2007/0070221 A1 and United States patent application US 2009/0097773 A1, the entire contents of which are incorporated herein by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION (1) Field of the Invention

The present invention relates to a method, a device and a program to process a moving image. More specifically, the present invention relates to a possibility of reducing motion blur which is caused by taking a picture.

(2) Description of Related Art Including Information Disclosed Under 37 CFR 1.97 and 1.98

In general, when a moving image is shot by a camera, then motion blur occurs because of an exposure for 1/60 seconds. Therefore it is important when processing a moving image to reduce the motion blur.

There are several methods which propose possibilities to reduce motion blur. However, most methods suffer from the deficiency, that they are either not adapted to high-frequency areas such as texture areas or that they have side effects for example discontinuity.

BRIEF SUMMARY OF THE INVENTION

It is therefore the object of the present invention to improve the prior art.

Specifically, in prior art there has not been sufficient consideration for motion blurring which occurs at the time of shooting (in the following it will be called imaging blur). Thus, image deterioration (blurred image) resulting from imaging blur has remained without being specifically corrected, and as a result, displaying a clear image on a display device has been difficult.

According to one aspect the present invention relates to an image processing method to process a moving image, which is shot by a predetermined video shooting device, in increments of access units, wherein the imaging blur is represented by a corresponding low-pass filter showing the properties of imaging blur which occurs at the time that said moving image is shot with said video shooting device, comprising the steps of generating an inverse filter having inverse properties as to said low-pass filter, and performing processing to apply said inverse filter to said access unit to be processed, wherein said step of generating an inverse filter includes an iterative algorithm in the frequency domain based on the original blurred image and the point spread function.

According to a further aspect the present invention relates to an image processing device to process a moving image, which is shot by a predetermined video shooting device, in increments of access units, wherein the imaging blur is represented by a corresponding low-pass filter showing the properties of imaging blur which occurs at the time that said moving image is shot with said video shooting device, comprising a reverse movement average filter generation unit for generating an inverse filter having inverse properties as to said low-pass filter, and an imaging blur suppressing processing unit for performing processing to apply said inverse filter to said access unit to be processed, wherein said reverse movement average filter generation unit is adapted to determine the inverse filter according to an iterative algorithm in the frequency domain based on the original blurred image and the point spread function.

According to yet a further aspect the present invention relates to a computer program product stored on a computer readable medium to process a moving image, which is shot by a predetermined video shooting device, in increments of access units, wherein the imaging blur is represented by a corresponding low-pass filter showing the properties of imaging blur which occurs at the time that said moving image is shot with said video shooting device, said computer program causing a computer to perform the steps generating an inverse filter having inverse properties as to said low-pass filter, and performing processing to apply said inverse filter to said access unit to be processed, wherein said step of generating an inverse filter includes an iterative algorithm in the frequency domain based on the original blurred image and the point spread function.

BRIEF DESCRIPTION OF THE SEVERAL VIEWS OF THE DRAWINGS

The present invention will now be explained in more detail in the following description of preferred embodiments in relation to the enclosed drawings in which.

DETAILED DESCRIPTION OF THE INVENTION

The image processing device of the present invention can be used as an entire television system or a component thereof. A television system indicates a system made up of one or more AV (audio and visual) devices including a television broadcast receiving device.

Figure 1:
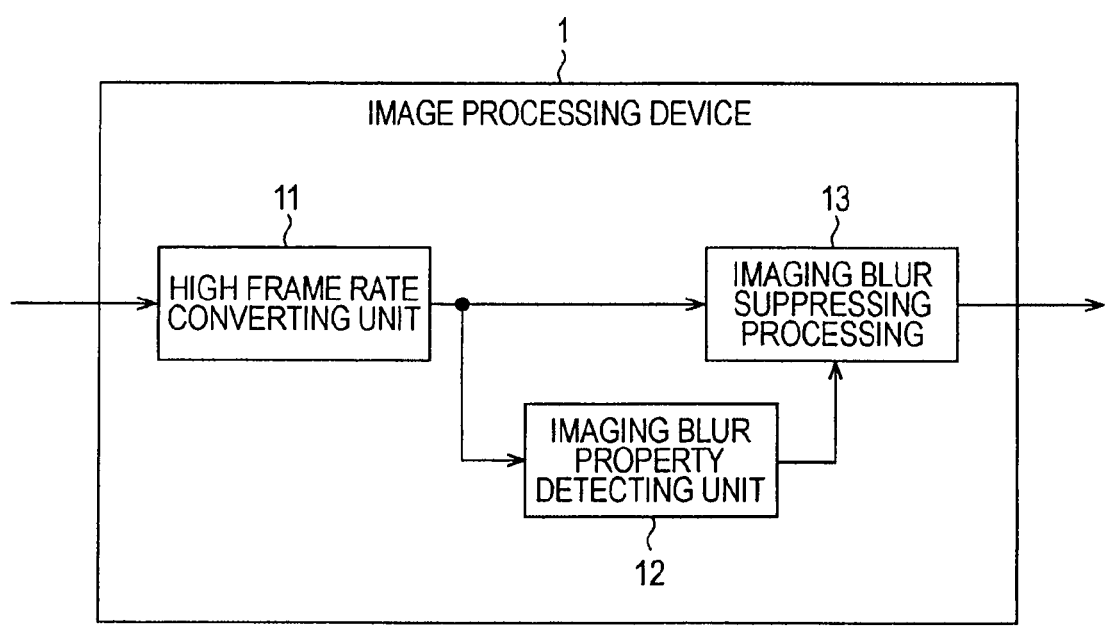
FIG. 1 is a block diagram illustrating an example of a functional configuration of an image processing device to which the present invention has been applied.

Next, embodiments of the present invention will be described with reference to the drawings. FIG. 1 shows an example of a functional configuration of an image processing device to which the present invention is applied.

An image processing device 1 executes various types of image processing as to moving image data in increments of access units. The term "access unit" refers to increments of moving images such as frames and fields, and specifically to all or a portion of each frame (still image) making up a moving image, for example. However, hereafter for simplification, let us say that the image processing device 1 executes various types of image processing as to moving image data in increments of frames.

The image processing device 1 is made up of a high frame rate converting unit 11, imaging blur property detecting unit 12, and imaging blur suppressing processing 13, as shown in FIG. 1.

A moving image signal of a television broadcasting signal and so forth is input in the high frame rate converting unit 11 as moving image data in frame increments, for example.

Note that hereafter, in the case that a moving image and the moving image data corresponding thereto do not have to be individually distinguished, these will be collectively referred to simply as "moving images". Similarly, in the case that a frame and the frame data corresponding thereto do not have to be individually distinguished, these will be collectively referred to simply as "frames".

In the case that a moving image of a first frame rate is input, the high frame rate converting unit 11 performs high frame rate converting processing as to such moving image, and supplies the moving image of a second frame rate at a higher frame rate than that of the first frame rate obtained as a result thereof to the imaging blur property detecting unit 12 and the imaging blur suppressing processing 13.

High frame rate converting processing is processing executed in the case that the first frame rate at the time of input is lower than the second frame rate at the time of output (display), and indicates processing to convert the first frame rate into a second frame rate higher than the first frame rate, by creating new frames and inserting each between the respective frames making up the moving image at the time of input.

Note that the first frame rate indicates the frame rate of a moving image at the point in time of input in the high frame rate converting unit 11. Accordingly, the first frame rate can become an arbitrary frame rate, but here let us say that the first frame rate is the frame rate when the moving image is shot by an unshown video shooting device, i.e. is an imaging frame rate, for example.

The imaging blur property detecting unit 12 detects parameter values indicating imaging blur properties for each of the frames making up a moving image supplied from the high frame rate converting unit 11. The detection results from the imaging blur property detecting unit 12, i.e. the parameter values showing imaging blur properties, are supplied to the imaging blur suppressing processing unit 13.

Note that the parameters indicating imaging blur properties are not particularly restricted but various parameters can be employed. However, specific examples of parameters indicating imaging blur properties will be described later.

Also, the number of detected parameter values showing imaging blur properties within one frame is not particularly restricted. For example, only one parameter value showing imaging blur properties may be detected, or parameter values showing imaging blur properties may be detected individually one at a time. Alternatively, one of the frames may be divided into several blocks, and parameter values showing imaging blur properties may be detected individually one at a time for each divided block.

The imaging blur suppressing processing unit 13 corrects each pixel value making up the frames to be processed, based on values corresponding to the frames to be processed of the parameter values detected with the imaging blur property detecting unit 12, for each of the frames making up the moving image supplied from the high frame rate converting unit 11. That is to say, the imaging blur suppressing processing unit 13 corrects each pixel value of the frames to be processed so that the imaging blur is suppressed, according to the imaging blur properties (parameter value) of the frames to be processed.

Thus, a moving image that has imaging blur suppressed by each pixel value of each frame being corrected, and a moving image that is converted to the second frame rate which is higher than the first frame rate at the time of input, is output externally from the image processing device 1 from the imaging blur suppressing processing unit 13.

Note that in the example of FIG. 1, the set of the imaging blur property detecting unit 12 and imaging blur suppressing processing unit 13 is combined with the high frame rate converting unit 11, but of course, these may be used as a set by itself, or may be used in combination with other unshown blocks (other image processing units performing predetermined image processing).

That is to say, the advantage of suppressing imaging blur can be realized with only the set of the imaging blur property detecting unit 12 and imaging blur suppressing processing unit 13. However, in order for this advantage to be more significant, combining the imaging blur property detecting unit 12 and imaging blur suppressing processing unit 13 with the high frame rate converting unit 11 as described above is favorable. The reason thereof will be described below.

Blurring that is recognized by a person in the event that the moving image displayed on an unshown display device is formed as an image on the retina of the person is blurring which is combining a hold blur from the eye of the person following a moving object included in the moving image and the above-described imaging blur which is added at the time of shooting of the moving image.

The imaging blur property here is shown as a low-pass filter, which will be described later with reference to FIG. 4 and so forth. That is to say, the image signal after imaging blur is a signal equivalent to a signal which has a low-pass filter applied to the image signal before imaging blur (an ideal image signal). Accordingly, the frequency property of the image signal after imaging blur drops as compared to the image signal before imaging blur. That is to say, the gain of the image signal after imaging blur generally drops as the frequency increases, as compared to the image signal before imaging blur.

The property of the hold blur here is also shown as a low-pass filter similar to the imaging blur property. That is to say, the image signal after the hold blur is a signal equivalent to the signal which has the low-pass filter applied to the image signal before the hold blur (image signal after imaging blur). Accordingly, frequency property of the image signal after the hold blur drops as compared to the image signal before the hold blur. That is to say, the gain of the image signal after the hold blur generally drops as the frequency increases, as compared to the image signal before the hold blur. However, the hold blur occurs only when the display device is a fixed image (hold) display device.

Accordingly, by performing high frame rate converting processing as to the image signal after imaging blur wherein the frequency property has already dropped because of imaging blur, suppressing the hold blur can be enabled. However, even if such high frame rate converting processing is performed, the imaging blur deterioration does not change, and the advantage of suppressing the blurring on a human retina is halved in the end. This will be described with reference to FIG. 2.

Figure 2:
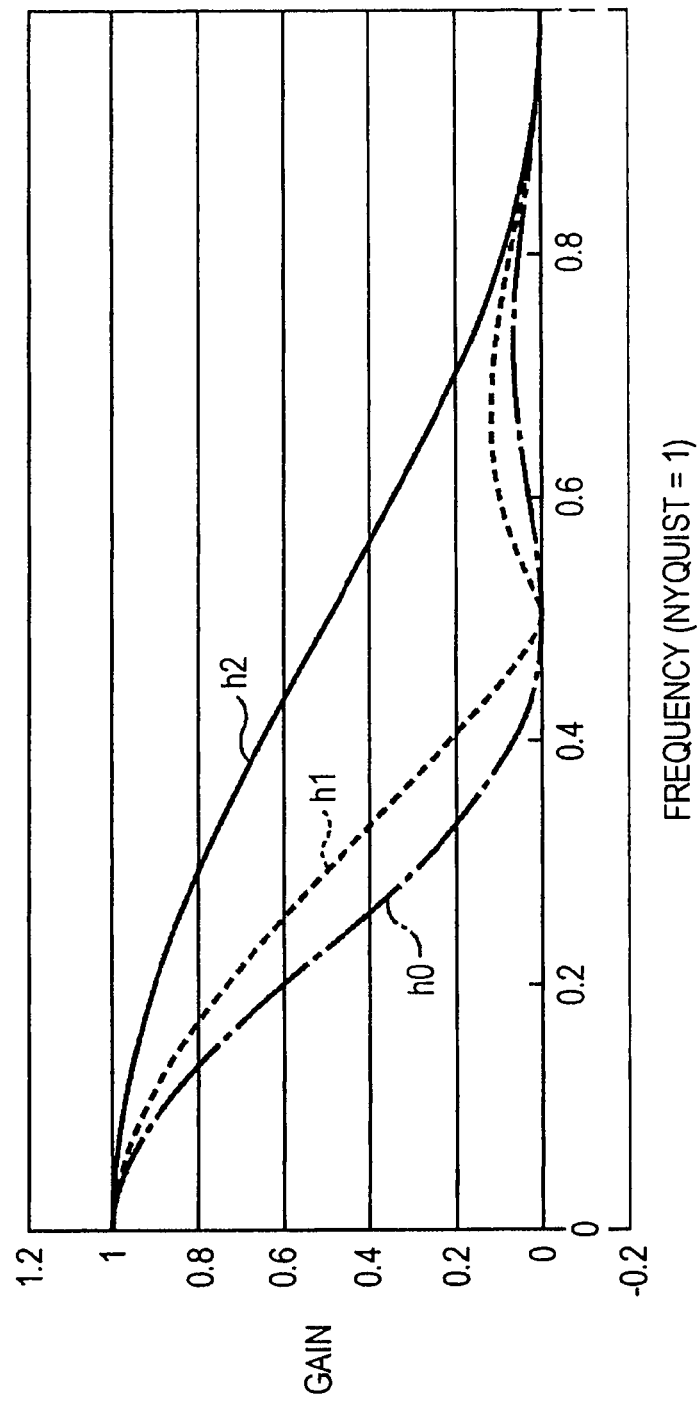
FIG. 2 is a diagram illustrating frequency properties of blurring of an image formed on a human retina.

FIG. 2 shows the frequency properties of the image blurring formed on the human retina at the time that an actual object moving at a moving speed 4 [pixels/frame] is shot within the shooting range of the video shooting device (hereafter called camera). In FIG. 2, the horizontal axis shows frequency and the vertical axis shows the respective gain. However, the various values of the horizontal axis shows the relative value in the case that a Nyquist frequency is 1.

In FIG. 2, the curve h0 shown with a dotted-broken line shows the frequency property of image blurring formed on the human retina in the case that processing to improve the blurring (includes imaging blur and hold blur) is not performed in particular. That is to say, in the case that the moving image input in the image processing device 1 in the example in FIG. 1 is supplied to and displayed on the display device without change instead of being input temporarily in the image processing device 1 (without being processed), the frequency property of the image blurring formed on the retina when the person views the moving image is the curve h0.

Conversely, if the display speed is doubled with the high frame rate converting processing for example, only the hold blur is improved, and as a result, the frequency property of the image blurring formed on the human retina becomes the curve h1 shown with a dotted line in the diagram. That is to say, in the case that the moving image input in the image processing device 1 in FIG. 1 is subjected to high frame rate converting processing with the high frame rate converting unit 11, and thereafter supplied to and displayed on the display device without being temporarily input in the imaging blur suppressing processing unit 13 (without the imaging blur being improved), the frequency property of the image blurring formed on the retina when the person views the moving image is the curve h1.

Also, for example, upon the display speed being doubled with the high frame rate converting processing (hold blur is improved), and the degree of imaging blur being improved by half, the frequency property of the imaging blur formed on a human retina becomes the curve h2 shown in the diagram as a solid line. That is to say, in the case that the moving image input in the image processing device 1 in FIG. 1 is subjected to high frame rate converting processing with the high frame rate converting unit 11, and further supplied to and displayed on the display device upon the imaging blur being suppressed with the imaging blur suppressing processing unit 13, the frequency property of the image blurring formed on the retina when the person views the moving image is the curve h2.

In comparing the curve h1 and curve h2, by only improving the hold blur with the high frame rate converting processing, improvement of the blur property on a human retina is insufficient, and the necessity for further improvements regarding imaging blur becomes apparent. However, as described above, with a method according to the related art, the necessity for improvement to imaging blur is not particularly considered, and high frame rate converting processing has been simply performed.

Thus, with the image processing device of the present invention realized as the embodiment in FIG. 1, other than the high frame rate converting unit 11, the imaging blur property detecting unit 12 and imaging blur suppressing processing unit 13 are provided so as to improve imaging blur, i.e. to improve the blur property on a human retina from the curve h0 to the curve h2 in FIG. 2.

That is to say, the imaging blur suppressing processing unit 13 suppresses image deterioration resulting from imaging blur on the frame after high frame rate conversion, by correcting each pixel value of the frames to be processed, based on the values corresponding to the frames to be processed of the parameter values showing the imaging blur properties detected with the imaging blur property detecting unit 12. That is to say, by supplying the image signal output from the image processing device of the present invention such as the image processing device 1 to an unshown display device, the display device can display a clear video having suppressed image deterioration, as video corresponding to the image signal thereof.

Thus, it is desirable to combine the set of the imaging blur property detecting unit 12 and the imaging blur suppressing processing unit 13 with the high frame rate converting unit 11.

Next, image processing of the image processing device having the functional configuration of FIG. 1 will be described with reference to the flowchart in FIG. 3.

In step S1, the high frame rate converting unit 11 inputs a moving image with the first frame rate.

In step S2, the high frame rate converting unit 11 converts the moving image frame rate to a second frame rate which is higher than the first frame rate.

Upon the moving image converted from the first frame rate to the second frame rate being supplied from the high frame rate converting unit 11 to the imaging blur detecting unit 12 and imaging blur suppressing processing unit 13, the processing is advanced to step S3.

In step S3, the imaging blur property detecting unit 12 detects one or more parameter values indicating imaging blur properties from each of the frames making up the moving image.

Upon the one or more parameters indicating imaging blur properties for each of the frames making up the moving image being supplied from the imaging blur property detecting unit 12 to the imaging blur suppressing processing unit 13, the processing is advanced to step S4.

In step S4, the imaging blur suppressing processing unit 13 corrects each pixel value of the frames to be processed for each frame making up the moving image supplied from the high frame rate converting unit 11, based on the one or more values corresponding to the frames to be processed of the parameter values detected with an imaging blur detecting unit 12.

In step S5, the imaging blur suppressing processing unit 13 outputs the moving image of which the pixel values for each frame have been corrected and which has been modified from the first frame rate to the second frame rate. Thus, the image processing in FIG. 3 is ended.

Note that with the above-described description, to simplify the description, a moving image has been the processing increment for the processing for each step of steps S1 through S5. However, in reality, in many cases a frame is the processing increment.

Figure 3:
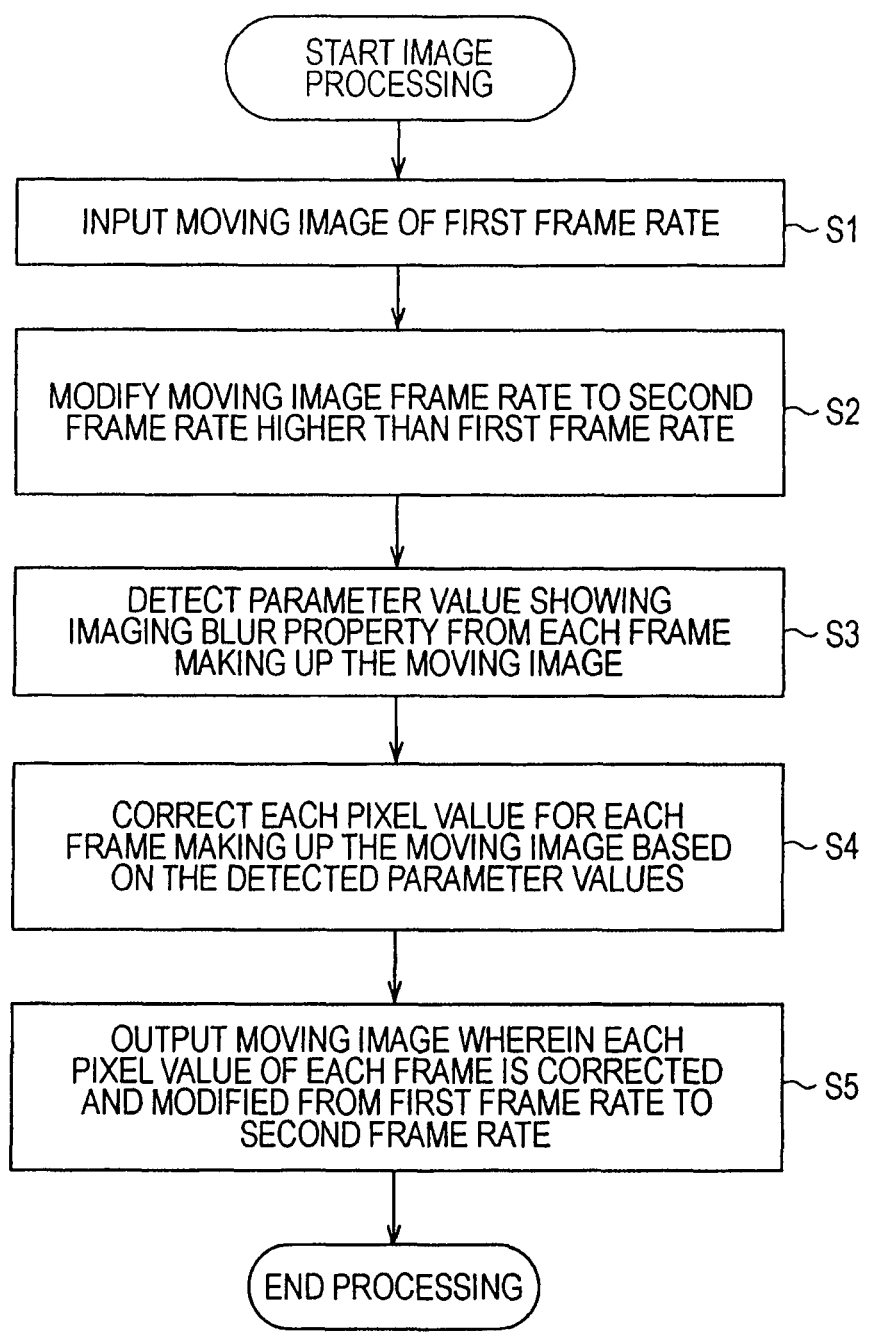
FIG. 3 is a flowchart describing image processing executed by the image processing device in FIG. 1.

With the image processing in FIG. 3, the processing increment for each step being a moving image is equivalent to the advancement conditions from the processing step in steps S1 through S5 to the next step being a condition wherein the processing for the steps to be processed is performed as to the entire moving image.

Conversely, with the image processing in FIG. 3, the processing increment for each step being a frame is equivalent to the advancement conditions from the processing step in steps S1 through S5 to the next step being a condition wherein the processing for the steps to be processed is performed as to one entire frame. In other words, that the processing increment for each step being a frame is equivalent to the continuous processing for steps S1 through S5 as to each respective frame being executed independently from other frames (in parallel). In this case, for example, a situation may occur that when the processing in step S3 as to the first frame is being executed, the processing of step S2 as to a different second frame is executed in parallel.

Further, in reality, in many cases the pixels making up a frame to be processed are set in order of the pixels to be of interest (hereafter called pixels of interest) as that to be processed, and at least the processing in steps S3 and S4 are sequentially individually performed. That is to say, the processing increments in steps S3 and S4 are often pixels.

Thus, with the following description also, description will be given as the processing in step S3 and S4 being in pixel increments. That is to say, the processing in step S3 is processing of the imaging blur property detecting unit 12, and the processing in step S4 is processing of the imaging blur suppressing processing unit 13. Accordingly, with the description below, the processing increments will be described as pixels for the imaging blur property detecting unit 12 and imaging blur suppressing processing unit 13.

Next, several embodiments of the imaging blur suppressing processing unit 13 of the image processing device 1 in FIG. 1 will be described. Specifically, as parameters indicating imaging blur properties, several examples of the imaging blur suppressing processing unit 13 in the case of using absolute values of motion vectors (hereafter called moving speed) will be described.

In the case that moving speed is used as a parameter showing imaging blur properties, the imaging blur property detecting unit 12 sequentially sets each pixel making up the frame to be processed as pixels of interest, sequentially detects the moving vectors of the pixels of interest, and sequentially supplies these to the imaging blur suppressing processing unit 13 as parameter values showing the imaging blur properties of the pixels of interest.

Accordingly, the imaging blur suppressing processing unit 13 sequentially sets each pixel making up the frame to be processed as pixels of interest for each frame making up the moving image, and based on the absolute value of the moving vector of the pixel of interest out of the moving vectors supplied from the imaging blur property detecting unit 12, i.e. based on the moving speed with the pixel of interest, the pixel values of the pixels of interest are sequentially corrected.

Now, the reason that the moving speed can be employed as a parameter for showing imaging blur properties will be described. The imaging blur property can generally be expressed in a state depending on the moving speed of an object subjected to shooting.

Note that the moving speed of an object subjected to shooting naturally includes the moving speed of the object (image) within a frame in the case that the object itself has moved within real space and the camera is fixed, at the time the object thereof is shot with the camera. Further, the moving speed of the object here also includes a relative moving speed of an object (image) within a frame in the case that the object is fixed in real space and the camera is moved by a hand shaking, or in the case that the object and camera are both moved in real space, at the time the object is shot with the camera.

Accordingly, the imaging blur property can be expressed in a state depending on the moving speed with each pixel making to the image of the object.

The moving speed of the pixel indicates a spatial distance between the pixel within the frame to be processed and the pixel corresponding to within a frame earlier thereof (corresponding point). For example, in the case that the spatial distance between the pixel within the frame to be processed and the image corresponding to within the immediately preceding (temporally one prior) frame is K pixels worth (K is an arbitrary integral of 0 or greater), the moving speed with the pixel thereof becomes K [pixels/frame].

In this case, if we say that of the various pixels making up the image of the object, one predetermined pixel is set as the pixel of interest, the imaging blur property of the pixel of interest can be expressed in a state depending on the size of the moving speed K [pixels/frame] with the pixel of interest.

Figure 4:
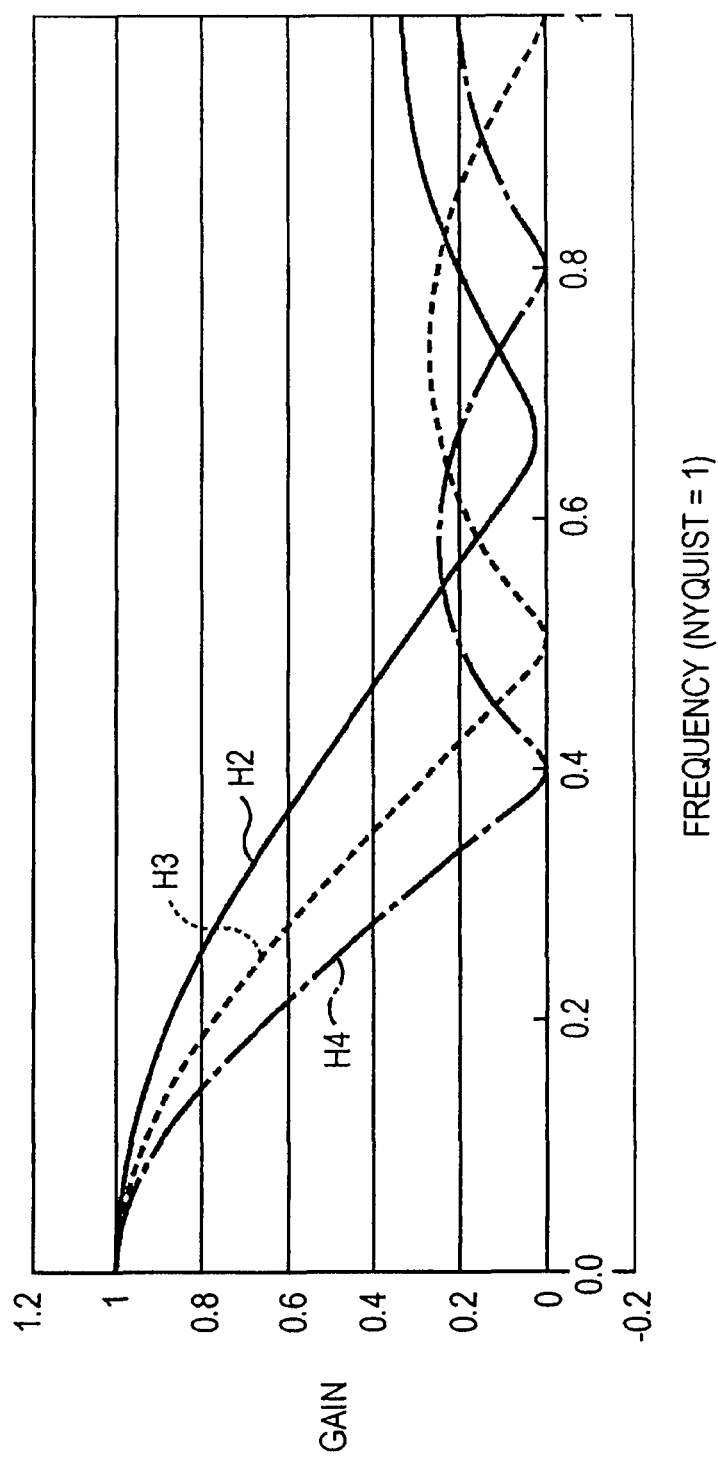
FIG. 4 is a diagram illustrating frequency properties of image blurring according to a movement vector (moving speed)

More specifically, for example, in each of the cases that the moving speeds with the pixel of interest are 2, 3, 4 [pixels/frame], the frequency properties of imaging blur with the pixel of interest can be expressed with the curves H2 through H4 in FIG. 4, respectively.

That is to say, FIG. 4 shows each of the frequency properties of imaging blur with the pixel of interest in each of the cases that the moving speeds with the pixel of interest are 2, 3, 4 [pixels/frame]. In FIG. 4, the horizontal axis shows frequency and the vertical axis shows gain (amplitude). However, each value of the horizontal axis shows a relative value in the case that the Nyquist frequency is 1. The above is the reason that moving speed can be employed as a parameter for showing imaging blur properties.

Now, as is clear from the states of the frequency properties H2 through H4, when expressing the imaging blur properties with the pixel of interest as a spatial region, the imaging blur properties can be represented with a moving average filter (low-pass filter). In other words, a transfer function showing the moving average filter (low-pass filter) (hereafter called imaging blur transfer function or point spread function) is represented by H, an ideal image signal in the case of image blurring not occurring (hereafter called signal before imaging blur) is denoted as F in the frequency region, and the actual image signal output from the camera, i.e. the image signal with imaging blur occurring (hereafter called signal after imaging blur is represented by G in the frequency region, the signal G after imaging blur is expressed as in the following Expression (1).

$$G = H * F \quad (1)$$

With the present invention, it is desirable to remove (suppress) imaging blur, so in order to achieve this, a signal F before imaging blur should be forecast-computed from a known signal G after imaging blur and a known transfer function H of the imaging blur. That is to say, the forecast computing in the following Expression (2) is executed.

$$F = \operatorname{inv}(H) * G \quad (2)$$

In Expression (2), inv(H) shows the inverse function of the transfer function H of the imaging blur. As described above, the transfer function H of the imaging blur has the properties of a low-pass filter, whereby the inverse function thereof inv(H) also naturally has the properties of a high-pass filter.

Also, as described above, with the transfer function H of the imaging blur, the properties thereof change according to moving speed. Specifically for example, in each case that the moving speed with the pixel of interest is 2, 3, 4 [pixels/frame], the frequency properties of the transfer function H of the imaging blur become differing properties as shown with each of the curves H2 through H4 in FIG. 4.

Accordingly, the imaging blur suppressing processing unit 13 modifies the properties of the transfer function H of the imaging blur according to moving speed, finds the inverse function inv(H) of the transfer function H with modified properties, and executes computing processing of the above-described Expression (2) using the inverse function inv(H), whereby the purpose of the invention, that is, removing (suppressing) imaging blur, can be achieved.

Alternatively, the above-described Expression (2) is a computation of the frequency region, so as to achieve the purpose of the present invention, the imaging blur processing unit 13 can execute processing with a spatial region equivalent to the computing processing in the above-described Expression (2). Specifically for example, the imaging blur suppressing processing unit 13 can execute processing such as the following first through third processing.

The first processing is processing to convert the properties of the moving average filter (low-pass filter) showing imaging blur with the pixel of interest according to moving speed with the pixel of interest supplied from the imaging blur property detecting unit 12. Specifically for example, processing wherein a moving average filter is prepared beforehand one at a time for each of multiple moving speeds, and one moving average filter corresponding to the moving speed with the pixel of interest is selected from the multiple moving average filters, is one example of the first processing.

The second processing is processing made up from the following processings 2-1 through 2-3.

The processing 2-1 is processing wherein, by performing Fourier transform as to the moving average filter with the properties converted with the first processing, the moving average filter there of displayed as frequencies. Specifically for example, in each case that the moving speeds with the pixel of interest are 2, 3, 4 [pixels/frame], the processing to obtain the respective curves. H2 through H4 in FIG. 4 is the processing 2-1. That is to say, to consider this in frequency regions, processing to find the transfer function H of the imaging blur with the pixel of interest is the processing 2-1. Note that hereafter the processing 2-1 will be called frequency converting processing.

The processing 2-2 is processing to compute an inverse number of the moving average filter displayed as frequency with the frequency converting processing (processing 2-1). That is to say, in terms of a frequency region, the processing generate the inverse function inv(H) of the transfer function H of imaging blur which is shown in the above-described Expression (2) is the processing 2-2. Note that hereafter the processing 2-2 will be called inverse function generating processing.

The processing 2-3 is processing to perform inverse Fourier transform as to the inverse function inv(H) computed with the inverse function generating processing (processing 2-2), i.e. the inverse number of the moving average filter displayed as frequency. That is to say, processing to generate a high-pass filter (Weiner filter or the like) corresponding to the inverse function inv(H) is the processing 2-3. Processing to generate the inverse filter of the moving average filter is the processing 2-3. Note that the high-pass filter generated with the processing 2-3 is called an inverse moving average filter. In other words, the processing to convert the inverse moving average filter expressed with a frequency region into a filter with a spatial region is the processing 2-3. Accordingly, hereafter the processing 2-3 will be called frequency inverse converting processing, corresponding to the frequency converting processing which is the processing 2-1.

The third processing is processing to input an image signal g of the spatial region corresponding to the signal G of the above-described Expression (2) of the frequency region after imaging blur as an input image, and to apply the inverse moving average filter generated by the frequency inverse converting processing (processing 2-3) as to the image signal g. With the third processing, an image signal f of a spatial region corresponding to the signal F of the above-described Expression (2) of the frequency region before imaging blur is restored (forecast computed). Specifically for example, the processing wherein, by applying the inverse moving average filter as to a predetermined block including the pixel of interest of the frame to be processed, the pixel value of the pixel of interest is corrected, is the third processing.

Figure 5:
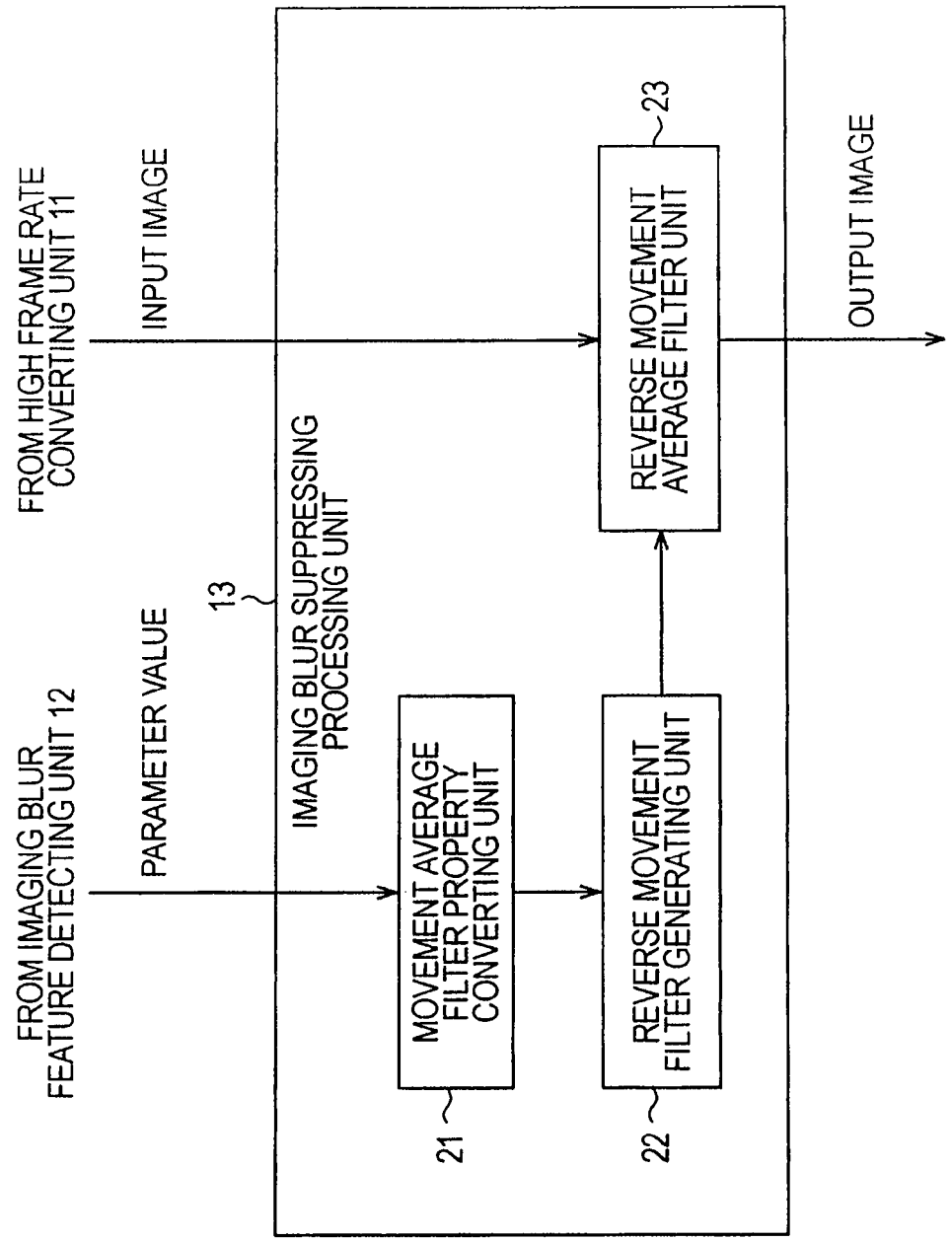
FIG. 5 is a block diagram illustrating an example of a functional configuration of an image blur suppressing processing unit in the image processing device in FIG. 1.

An example of the functional configuration of the imaging blur suppressing processing unit 13 which can execute the first through third processing is shown in FIG. 5. That is to say, FIG. 5 shows an example of the functional configuration of the imaging blur suppressing processing unit 13.

With the imaging blur suppressing processing unit 13 in the example in FIG. 5, a moving average filter property converting unit 21, inverse moving average filter generating unit 22, and inverse moving average filter unit 23 are provided thereto.

The moving average filter property converting unit 21 executes the above-described first processing. The inverse moving average filter generating unit 22 executes the above-described second processing. The inverse moving average filter unit 23 executes the above-described third processing.

Figure 6:
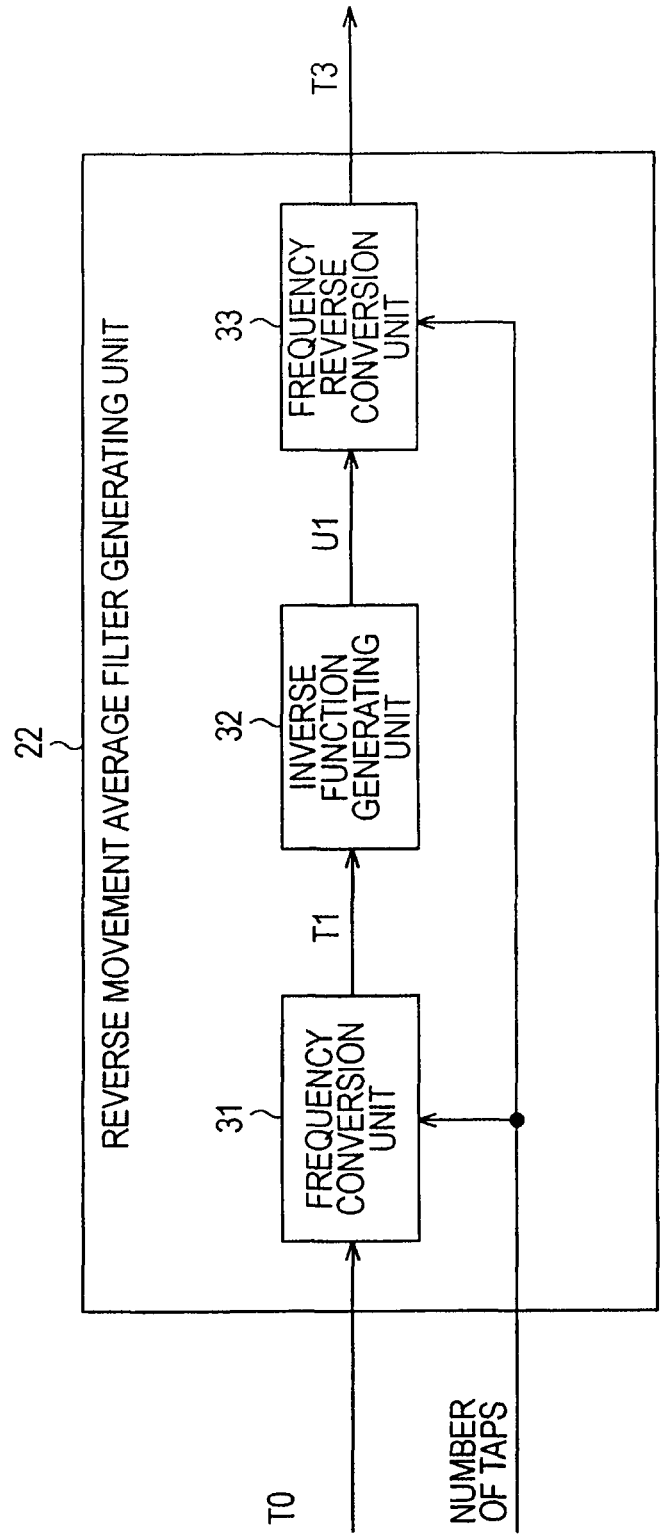
FIG. 6 is a block diagram illustrating an example of a functional configuration of a reverse movement average filter generating unit of the image blur suppressing processing unit in FIG. 5.

That is to say, the inverse moving average filter generating unit 22 may have a functional configuration such as that shown in FIG. 6, for example. A frequency converting unit 31, inverse function generating unit 32, and frequency inverse converting unit 33 are provided on the inverse moving average filter generating unit 22 in FIG. 6.

The moving average filter with properties converted with the moving average filter property converting unit 21 is input as an input signal T0 which is a spatial region signal as to the frequency converting unit 31. Thus, the frequency converting unit 31 performs the above-described frequency converting processing as to the input signal T0, and outputs a signal T1 indicating the transfer function H of the imaging blur obtained as a result thereof.

Note that the signal T1 is a signal which is sampled with a previously set number of taps. Therefore, the same number of taps is also input in the inverse frequency converting unit 33 which performs the above-described frequency inverse converting processing.

The inverse function generating unit 32 performs the above-described inverse function generating processing as to the signal T1, and generates and outputs a signal U1 corresponding to the inverse function inv(H) obtained as a result thereof.

The frequency inverse converting unit 33 performs the above-described frequency inverse converting processing as to the signal U1, whereby a signal T3 showing the inverse moving average filter is generated and output. The reverse movement average filter corresponding to the signal T3 is input in the inverse moving average filter unit 23 in FIG. 5, and is used to execute the above-described third processing.

The present invention now proposes a specific way of generating the inverse function. The inverse function is hereby generated based on an iterative algorithm in the frequency domain based on the original blurred image and the point spread function. More specifically after applying a Fourier transformation to the low-pass filter TO the point spread function T1 is obtained. Based on the iterative algorithm an inverse point spread function U1 is generated and after applying an inverse Fourier transformation to the inverse point spread function U1 the inverse filter T3 is obtained.

A known method of reducing motion blur in still images using temporal information and iteration is for example the Richardson-Lucy algorithm. But this algorithm is very complicated when applied to moving images and therefore it is too expensive when integrating the algorithm into corresponding chip designs.

The present invention therefore proposes an iterative algorithm basing on the Richardson-Lucy algorithm which can be applied to moving images and at the same can be time easily integrated even into low-resource devices. The Richardson-Lucy algorithm bases on the following formula:

$$\hat{f}_j^{(t+1)} = \hat{f}_j^{(t)} \times \Sigma_i (g_i/g'_i) \times h_{ij}$$

$$g'_i = \Sigma_j \hat{f}_j^{(t)} \times h_{ij} \quad (3):$$

In order to apply this formula to moving images the formula was converted to be applied in the frequency domain and the iterative algorithm bases on the following expression:

$$\hat{F}^{(t+1)} = \hat{F}^{(t)} + (G - G') \times H$$

$$G' = \hat{F}^{(t)} \times H \times H$$

$$\hat{F}^{(0)} = G \quad (4):$$

Hereby, as previously explained, H represents the point spread function, G represents the blurred image gain function and F represents the original image gain function. The index t indicates the iteration cycle.

Figure 7:
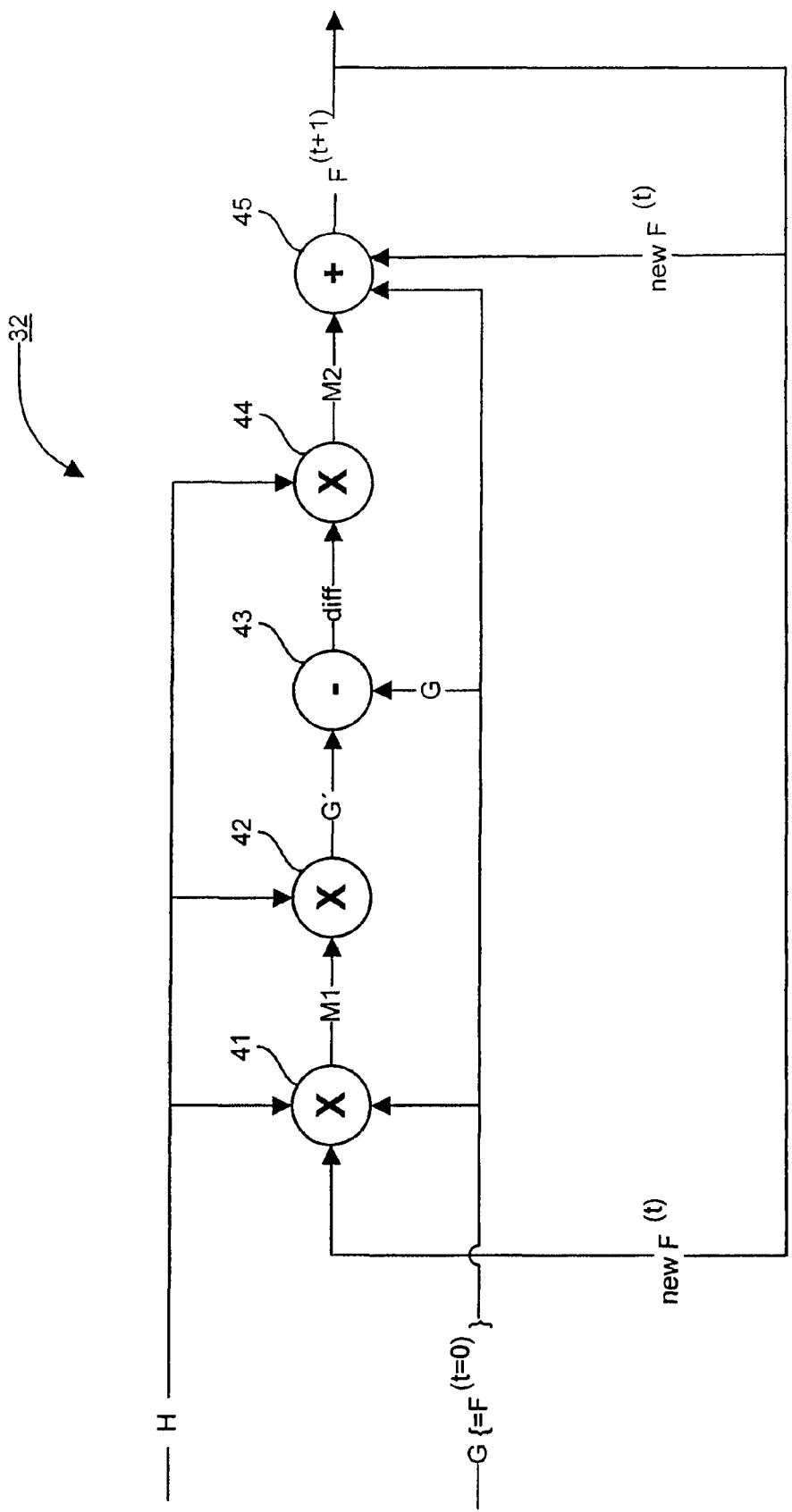
FIG. 7 is a block diagram illustrating an example of a functional configuration of the inverse function generating unit according to the present invention.
Figure 9:
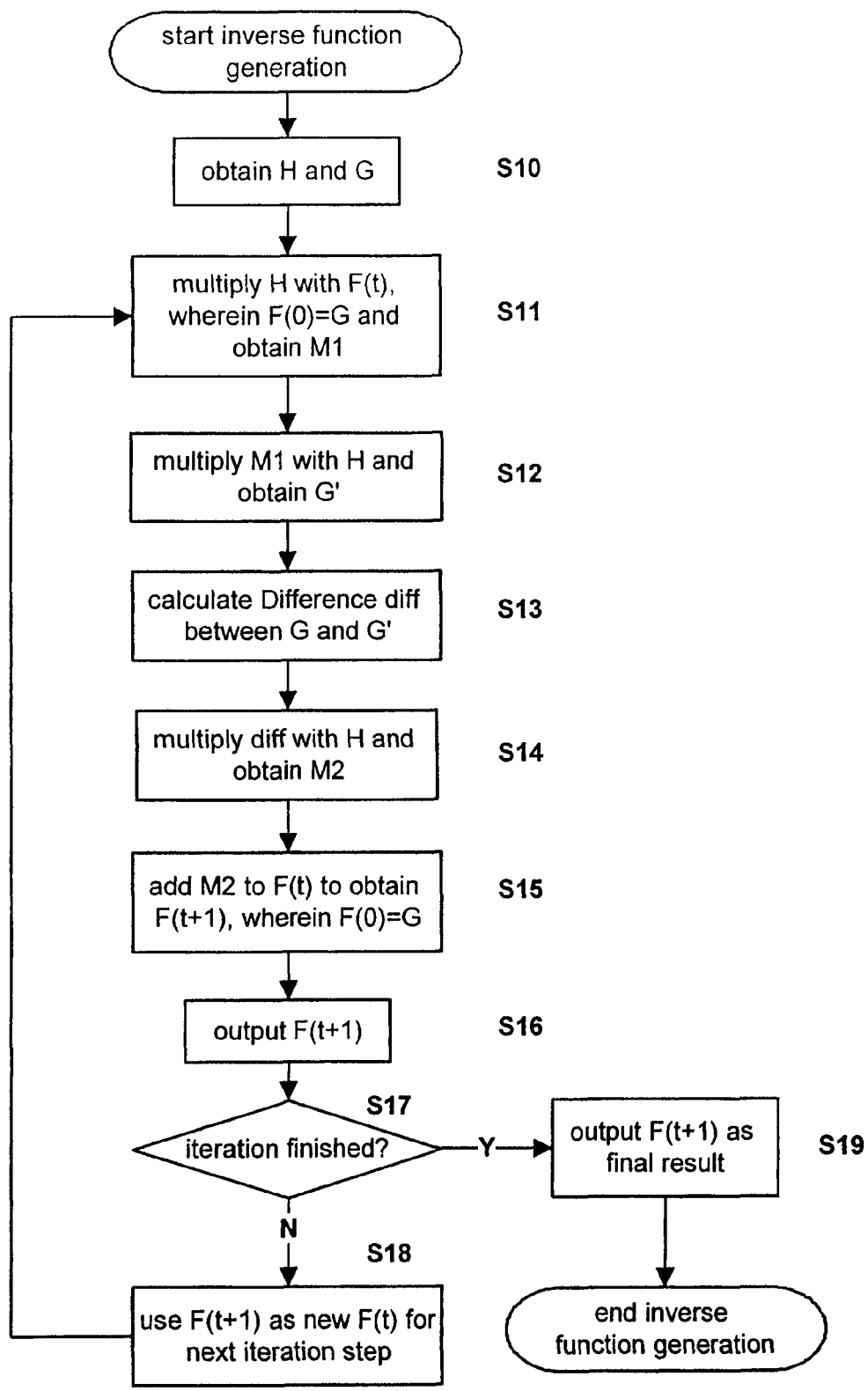
FIG. 9 is a flow chart describing image processing executed by the inverse function generating unit according to the present invention.

In the following the different components of the inverse function generating unit will be explained with reference to FIG. 7 and the corresponding steps will be explained with reference to FIG. 9.

In step S10 the point spread function H and the original blurred image G are obtained. As can be seen from the above formula, the algorithm is iterative and every $F^{t+1}$ bases on a previous $F^t$. For the case that $F^{t=0}$, i.e. for the initial $F^t$, F corresponds to G. This is also indicated in FIG. 7. Accordingly, only in the first iteration step the original blurred image G is fed to those components, to which in the following iteration steps the previous $F^t$, i.e. the $F^t$ of the previous iteration step is submitted. In every following iteration step a new $F^t$ is fed to the respective components after being obtained from the previous iteration step.

Correspondingly, when starting the iteration, $F^{t=0}$ and the point spread function H are submitted to a first multiplier 41. In step S11 the point spread function H is multiplied with $F^t$, wherein as explained $F^{t=0}=G$. Thereby the first multiplication result M1 is obtained and submitted to a second multiplier 42.

In the following step S12 the first multiplication result M1 is again multiplied with the point spread function H and thereby an intermediate result G' is obtained.

The intermediate results G' and G are submitted to a subtraction unit 43. In the next step S13 by the subtraction unit calculates the difference between the intermediate result G' and the original blurred image G and the difference "diff" is obtained and output to a third multiplicator 44. To the third multiplicator 44 also the points spread function is submitted.

In the next step S14 in the third multiplicator 44 the difference diff is multiplied with the point spread function H and thereby the second multiplication result M2 is obtained. The second multiplication result M2 and $F^t$ is submitted to an adding unit 45.

In the next step S15 the second multiplication result M2 is added to $F^t$ to obtain $F^{t+1}$, where again for the case of $F^{t=0}$ it is defined that $F^{t=0}=G$.

The result of the adding unit 45 in step S16 is then output as $F^{t+1}$. In the next step S17 it is checked whether the iteration is finished. If this is not the case then the previously output $F^{t+1}$ is used as new $F^t$ in step S18 and fed back to the first multiplicator 41 as well as to the adding unit 45, where not this $F^t$ is used and not the original blurred image G. The process then starts again with a multiplication of the point spread function and $F^t$ by the first multiplicator 41 in step S11.

Otherwise, if in step S17 it is determined that the iteration is finished, then in the next step S19 $F^{t+1}$ is output as final result and the inverse function generation ends.

Figure 8:
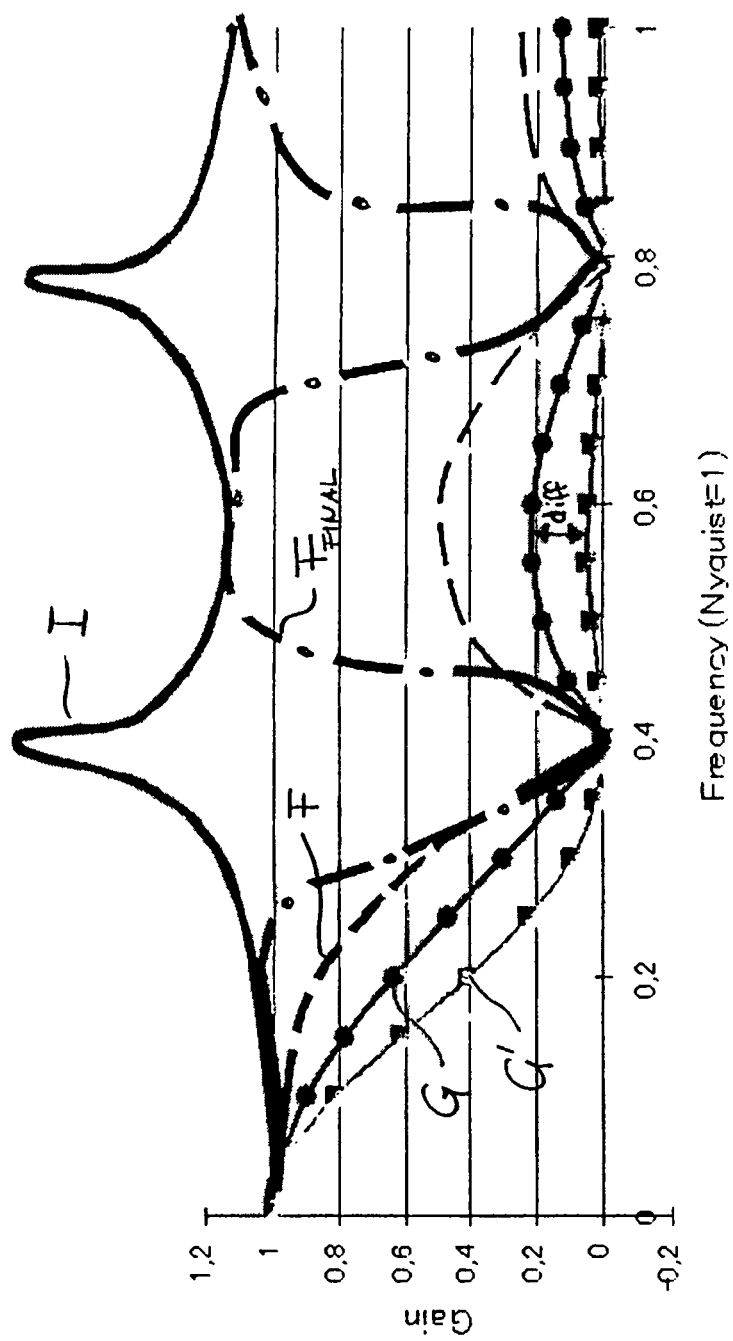
FIG. 8 is a diagram illustrating an example of the frequency property of each output signal of the components of the inverse function generating unit in FIG. 7.

The present invention and its advantages will further become apparent when being explained with reference to FIG. 8, where different examples of frequency properties of each output signal of the components of the inverse function generating unit are shown. The different signals are shown in frequency domain. Hereby, on the x-axis the frequency is shown and on the y-axis the gain.

The original blurred image G is shown as a line with dots. The intermediate result G' is shown as a line with squares. When the iteration algorithm is started, then as inverse function F a first result is obtained which is shown in the figure as dashed line. With subsequent iteration the inverse function F will convert to the curve indicated with $F_{final}$ and shown in FIG. 8 dashed-dotted line. Also shown in FIG. 8 is the ideal inverse filter curve I.

To obtain a good result it is important that the inverse function does not exceed the inverse filter curve I. As can be seen with the algorithm according to the present invention, the final result F will convert partly to the inverse filtering result I but not exceed it.

With the present invention thus robustness against noise is kept and an accuracy without side effect is achieved by using an iterative algorithm in the frequency domain, for example by shrinking the Richardson-Lucy algorithm to be able to apply it to a moving image and integrate it into low-capacity chips.

Further, in the end, the above-described advantages can be realized by employing the imaging blur suppressing processing unit 13 having a configuration such as follows. In other words, the imaging blur suppressing processing unit 13 having is nothing more than an exemplification of at least a portion of an image processing device having a configuration such as follows.

That is to say, for an access unit to be processed, if an image processing device corrects the access unit to be processed by changing the properties of a low-pass filter which indicates imaging blur according to parameter values showing the properties of imaging blur which occurs at the time that the moving image is shot with the video shooting device, generating an inverse filter having inverse properties as to the low-pass filter, and performing processing to apply the inverse filters as to the access unit to be processed; wherein, with a frequency of which the frequency property of the low-pass filter indicating the imaging blur is zero being zero points, performing processing to apply the inverse filter is forbidden for predetermined frequency components of the frequency components of the access unit to be processed including the zero points, the above-described advantages can be realized.

As an embodiment of the imaging blur suppressing processing unit 13 of the image processing device 1 in FIG. 1 to which the present invention is applied, the imaging blur suppressing processing unit 13 having the functional configuration in FIG. 5 has been described.

In the event that pixel value correction for each pixel value is performed, the imaging blur suppressing processing unit 13 uses moving speed (absolute value of moving vector) as a parameter with the above-described example, but other than the moving speed, any arbitrary parameter may be used as long as the parameter indicates imaging blur properties.

Specifically for example, the imaging blur suppressing processing unit 13 can use camera shutter speed at the point in time that the moving image to be processed is shot, as a parameter indicating imaging blur properties. This is because if the shutter speed differs, the imaging blur degrees differ by the amount of time Ts in the same diagram, as shown in FIG. 10, for example.

Figure 10:
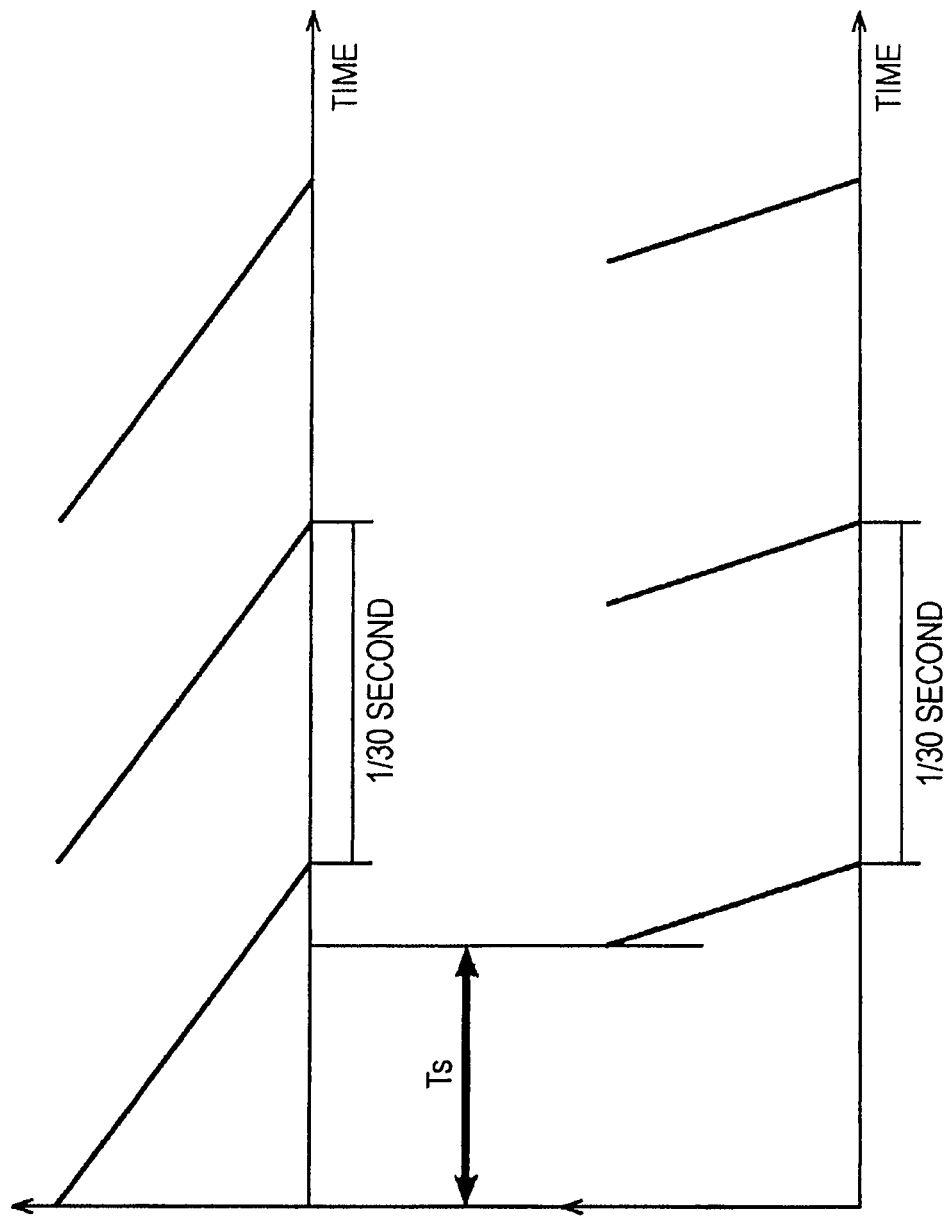
FIG. 10 is a diagram describing camera shutter speed and imaging blur properties.

That is to say, in FIG. 10, the diagram on the upper side shows a diagram in the case that the shutter speed is ⅓₀ second which is the same as the frame speed, and the diagram on the lower side shows a diagram in the case that the shutter speed is an earlier (⅓₀-Ts) seconds than the frame speed. With both diagrams in FIG. 10, the horizontal axis shows a time axis, and the vertical axis shows the rate of shutter opening time. The rate of shutter opening time is, for example, is a rate expressed by (Ta/V).times.100[%] in the case that the shutter speed is V [seconds] (V is an arbitrary value of 0 or greater than 0), the rate of a first point-in-time that the shutter is opened being 0%, the rate of a second point-in-time that the shutter is closed from the first point-in-time until V [seconds] have elapsed being 100%, and the time Ta [seconds] (Ta is an arbitrary positive value of 0 or greater than 0 and at or below V) from the first point-in-time until the current point-in-time. In this case, with the vertical axis in both diagrams in FIG. 10, the value touching the time axis becomes 100[%], and the maximum value (the value on the highest position of each line) becomes 0[%]. That is to say, with the vertical axis in both diagrams in FIG. 10, the lower on the vertical axis, the greater the rate of shutter opening time becomes.

For example, let us say that one detecting element of the camera is corresponding to one pixel within the frame. In this case, as shown in the diagram on the upper side of FIG. 10, when the shutter speed is ⅓₀ second, an integrated value of input light during the ⅓₀ second that the shutter is open is output from the one detecting element of the camera as a pixel value of the corresponding pixel.

Conversely, in the case that the shutter speed is (⅓₀-Ts) second, the integrated value of input light during the (⅓₀-Ts) second that the shutter is open is output from the one detecting element of the camera as a pixel value of the corresponding pixel.

That is to say, the shutter speed corresponds to the time that light accumulates in the detecting element. Accordingly, in the case that if there is an object moving in a real space across in front of a predetermined detecting element, for example, light differing from the light corresponding to the object, e.g. background light is input the amount of time Ts [seconds] more so when the shutter speed is ⅓₀ seconds rather than (⅓₀-Ts) seconds. Thus, the rate that the accumulating values of light such as background light which differs from that of the object is combined in the pixel values output from one detecting element is greater when the shutter speed is ⅓₀ seconds than when the shutter speed is (⅓₀-Ts) seconds. Consequently, the degree of imaging blur is greater.

To summarize the above, the slower the shutter speed becomes, the greater the degree of imaging blur becomes. That is to say, shutter speed can be said to indicate one property of imaging blur. Accordingly, shutter speed, as with moving speed, can be used as a parameter to indicate imaging blur properties.

Note that in the case such shutter speed is used as a parameter to indicate imaging blur properties, the imaging blur property detecting unit 12 in FIG. 1 analyzes header information and so forth appended to the moving image (data) supplied from a high frame rate converting unit 11, for example, shutter speed for each frame is detected, and these can be supplied to the imaging blur suppressing processing unit 13 as parameters to indicate imaging blur properties. The imaging blur suppressing processing unit 13 executes the above-described series of processing using the shutter speed instead of moving speed, for example, whereby each pixel value can be appropriately corrected. The configuration of the imaging blur suppressing processing unit 13 in the case of using the shutter speed can assume basically the same configuration as that in the case of using moving speed. That is to say, the imaging blur suppressing processing unit 13 having the functional configuration in FIG. 5 as described above can execute the above-described series of processing using the shutter speed as parameter values, thus appropriately correcting each pixel value.

The above description is given for an image processing device 1 having the functional configuration shown in FIG. 1 as an embodiment of the image processing device to which the present invention is applied, but the present invention is not limited to the example in FIG. 1, and may take various other embodiments thereof.

Figure 11:
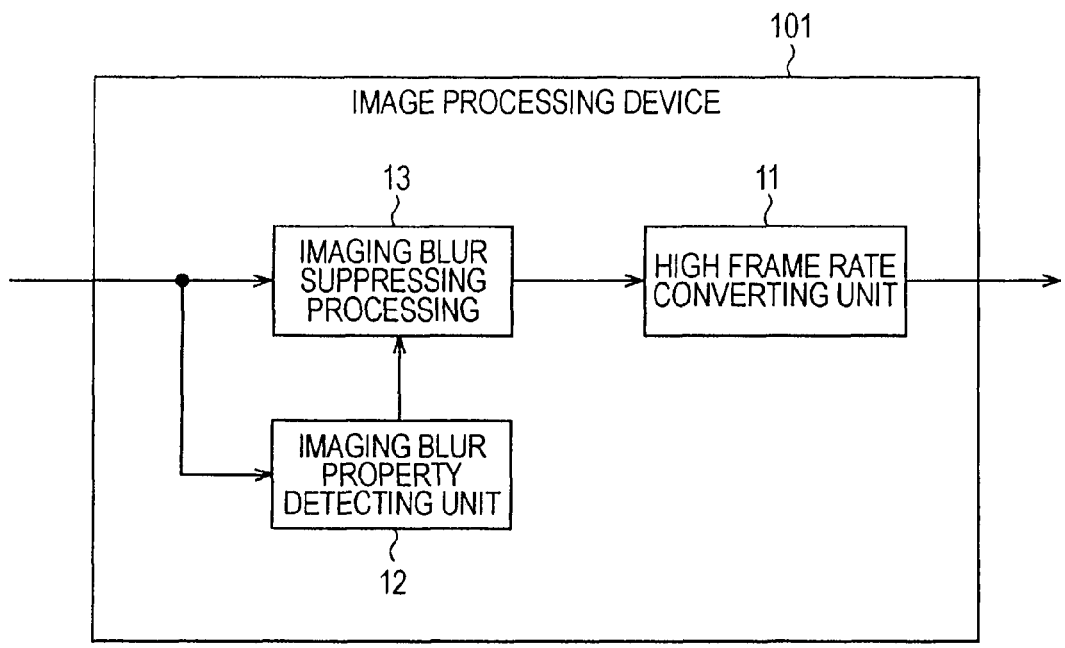
FIG. 11 is a block diagram illustrating an example different from FIG. 1 with the functional configuration of the image processing device to which the present invention is applied.

Specifically for example, function block diagrams for other embodiments of an image processing device to which the present invention is applied are shown in each of FIGS. 11 through 14. For example, the image processing device 101 in FIG. 11 is made up of a high frame rate converting unit 11, imaging blur property detecting unit 12, and imaging blur suppressing processing unit 13, similar to the image processing device 1 in FIG. 1.

However, with the image processing device 101 in FIG. 11, the moving image to be subjected to correction processing with the imaging blur suppressing processing unit 13 is the input moving image of the image processing device 101, i.e. the moving image before high frame rate converting processing is performed with a high frame rate converting unit 11. Thus, the imaging blur property detecting unit 12 also detects parameter values indicating imaging blur properties from the moving images before high frame rate converting processing is performed with the high frame rate converting unit 11, and supplies the detection results thereof to the imaging blur suppressing processing unit 13.

Accordingly, the image processing of the image processing device 101 in FIG. 11 becomes processing of the image processing in FIG. 3 wherein each of the processing steps S1, S3, S4, S2, and S5 are executed in such sequence.

Figure 12:
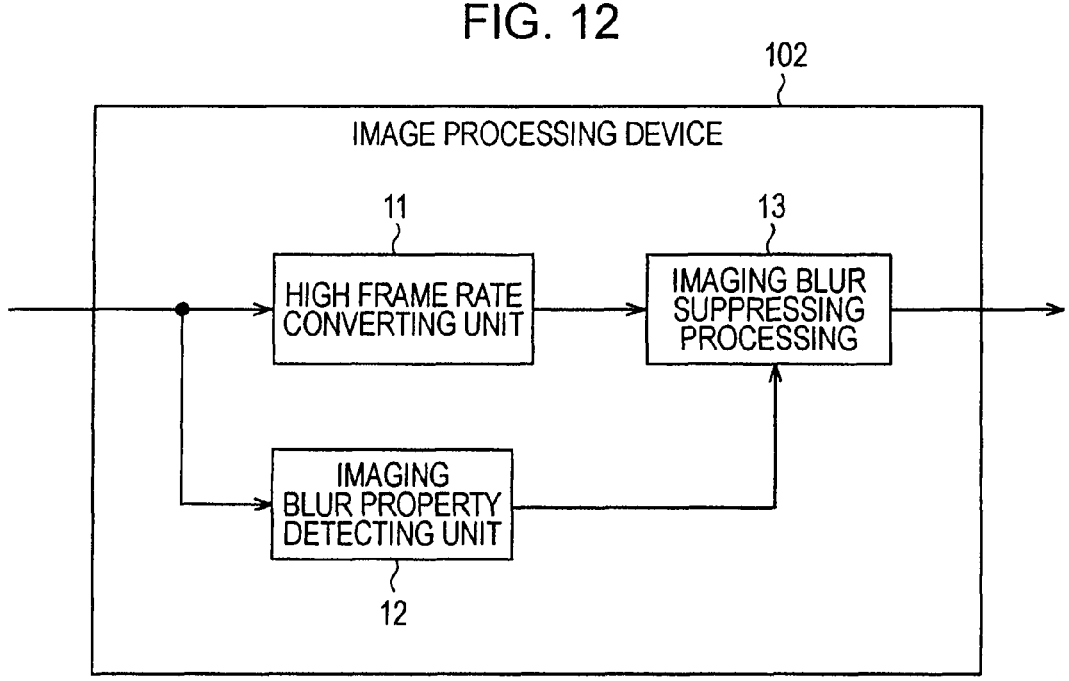
FIG. 12 is a block diagram illustrating an example different from FIGS. 1 and 11 with the functional configuration of the image processing device to which the present invention is applied.

Also, for example, the image processing device 102 in FIG. 12 is made up of a high frame rate converting unit 11, imaging blur property detecting unit 12, and imaging blur suppressing processing unit 13, similar to the image processing device 1 in FIG. 1 and image processing device 101 in FIG. 11.

With the image processing device 102 in FIG. 12, the moving image to be subjected to correction processing with the imaging blur suppressing processing unit 13 is the moving image obtained as a result of high frame rate converting processing performed as to the input moving image by the high frame rate converting unit 11, similar to the image processing device 1 in FIG. 1. That is to say, the imaging blur suppressing processing unit 13 performs correction processing as to the moving image after high frame rate converting processing is performed.

However, the imaging blur property detecting unit 12 of the image processing device 102 in FIG. 12 detects a parameter indicating imaging blur properties from the input moving image, i.e. from the moving image before the high frame rate converting processing is performed with the high frame rate converting unit 11, and supplies the detection results thereof to the imaging blur suppressing processing unit 13. That is to say, the imaging blur suppressing processing unit 13 of the image processing device 102 in FIG. 12 uses the parameter values detected from the moving image before high frame rate converting processing is performed, and corrects each of the pixel values.

From the above, the image processing of the image processing device 102 in FIG. 12 also becomes processing to be executed in a similar flow as the image processing in FIG. 3, i.e. the processing of each of the steps S1, S2, S3, S4, and S5 are executed in such sequence. However, with the processing in step S3, the processing can be said to "detect the parameter values indicating imaging blur properties from the moving image before high frame rate converting processing is performed, i.e. from each frame making up the moving image input with the processing in step S1."

Figure 13:
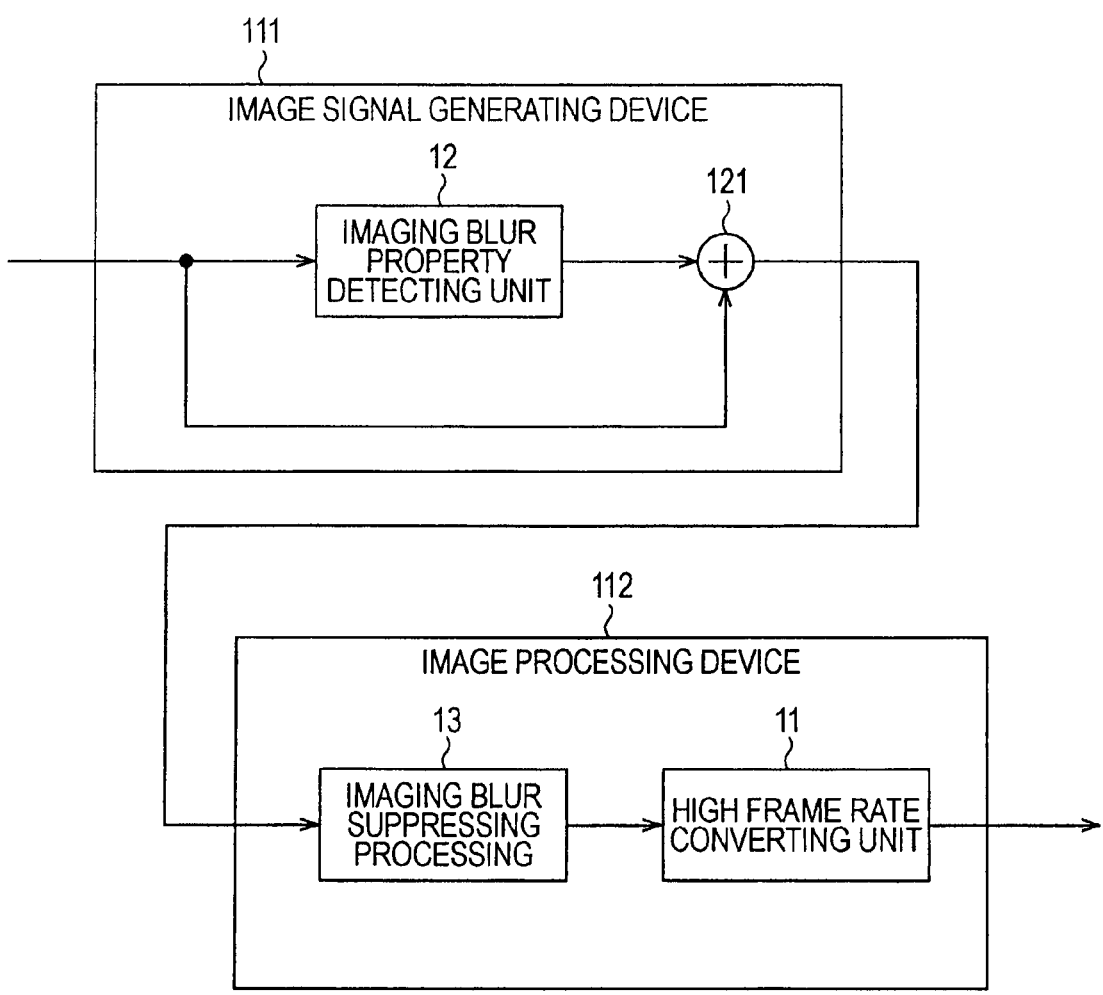
FIG. 13 is a block diagram illustrating an example different from FIGS. 1, 11, and 12 with the functional configuration of the image processing device to which the present invention is applied.
Figure 14:
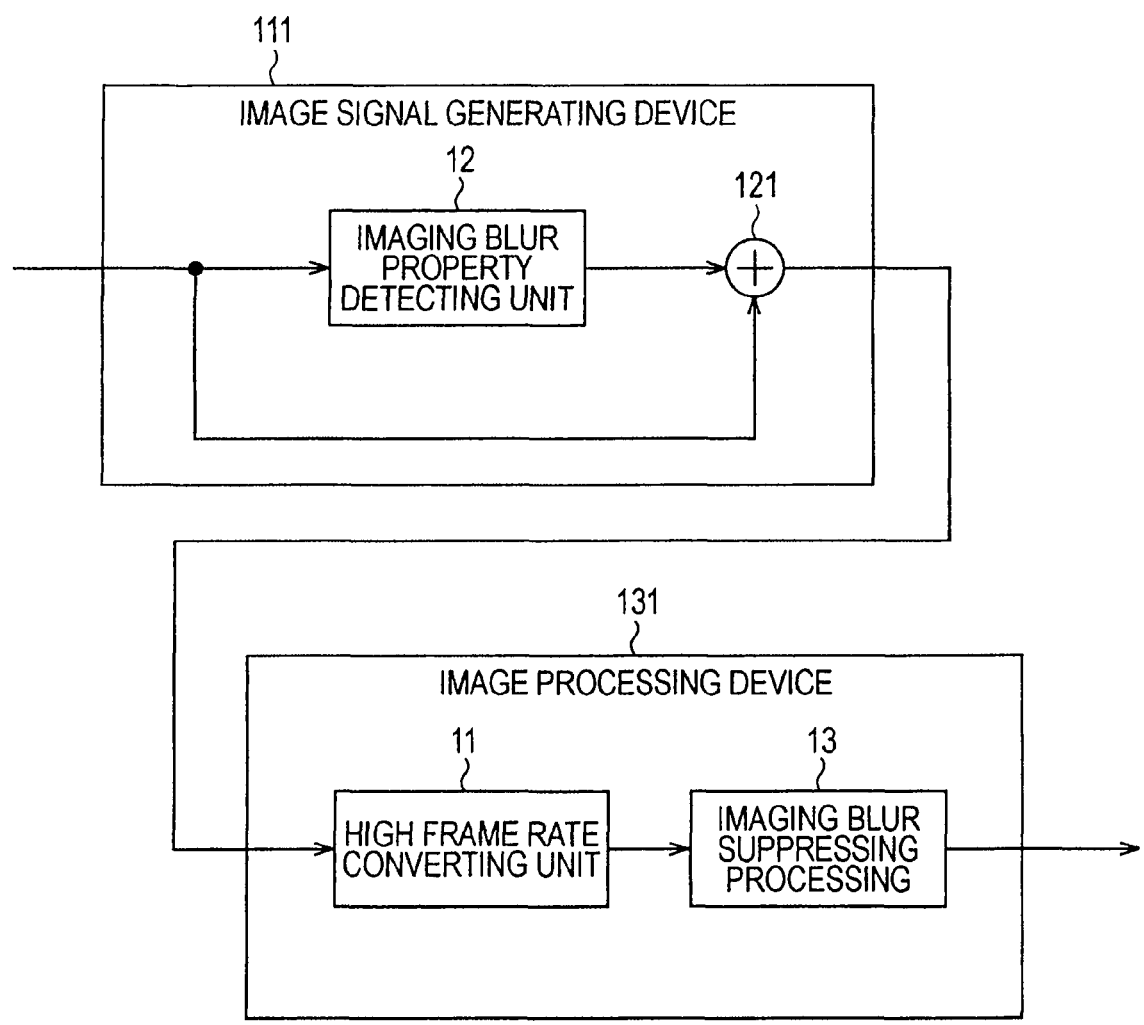
FIG. 14 is a block diagram illustrating an example different from FIGS. 1, 11, 12, and 13 with the functional configuration of the image processing device to which the present invention is applied.

As opposed to such an image processing device 101 in FIG. 11 and image processing device 102 in FIG. 12, the image processing device 112 in FIG. 13 and image processing device 131 in FIG. 14 are made up of a high frame rate converting unit 11 and imaging blur suppressing processing unit 13, and the imaging blur property detecting unit 12 is not included in the components thereof.

That is to say, as shown in FIGS. 13 and 14, the imaging blur property detecting unit 12 is provided along with a superimposed portion 121 within another image processing device 111 (hereafter called image signal generating device 111 to match the description in the diagram). The moving image input in the image signal generating device 111 is supplied to the imaging blur property detecting unit 12 and superimposed portion 121. The imaging blur property detecting unit 12 detects the parameter values indicating imaging blur properties from the moving image herein, and supplies this to the superimposed portion 121. The superimposed portion 121 superimposes the parameter values indicating imaging blur properties as to the moving image, and outputs a signal obtained as a result thereof.

Accordingly, the moving image (signal) on which the parameter values indicating imaging blur properties is superimposed is supplied to the image processing device 112 in FIG. 13 and image processing device 131 in FIG. 14 from the image signal generating device 111.

Thus, for example, with the image processing device 112 in FIG. 13, the imaging blur suppressing processing unit 13 separates the parameter values indicating imaging blur properties and the moving image, and corrects each pixel value based on the separated parameter values indicating the imaging blur properties for each of the frames making up the separated moving image.

Next, the high frame rate converting unit 111 performs high frame rate converting processing as to the moving image corrected with the imaging blur suppressing processing unit 13, and the moving image obtained as a result thereof, i.e. the moving image subjected to high frame rate conversion and correction is output.

Thus, the image processing of the image processing device 112 in FIG. 13 becomes processing of the image processing in FIG. 3 wherein each of the processing in steps S1, S4, S2, and S5 are executed in such sequence.

For example, with the image processing device 131 in FIG. 14, the high frame rate converting unit 11 separates the parameter values indicating imaging blur properties and the moving image, and subjects the separated moving image to high frame rate converting processing, and supplies the moving image obtained as a result thereof, i.e. the moving image converted to a high frame rate to the imaging blur suppressing processing unit 13. At this time, the parameter values indicating imaging blur properties separated with the high frame rate converting unit 11 will also be supplied to the imaging blur suppressing processing unit 13.

Next, the imaging blur suppressing processing unit 13 corrects each pixel value based on the parameter values indicating imaging blur properties for each of the frames making up the moving image converted to a high frame rate, and outputs the moving image obtained as a result thereof, i.e. the moving image subjected to correction and converted to a high frame rate.

Now, the above-described series of processing (or a portion of processing thereof) can be executed with hardware, but also can be executed with software.

Figure 15:
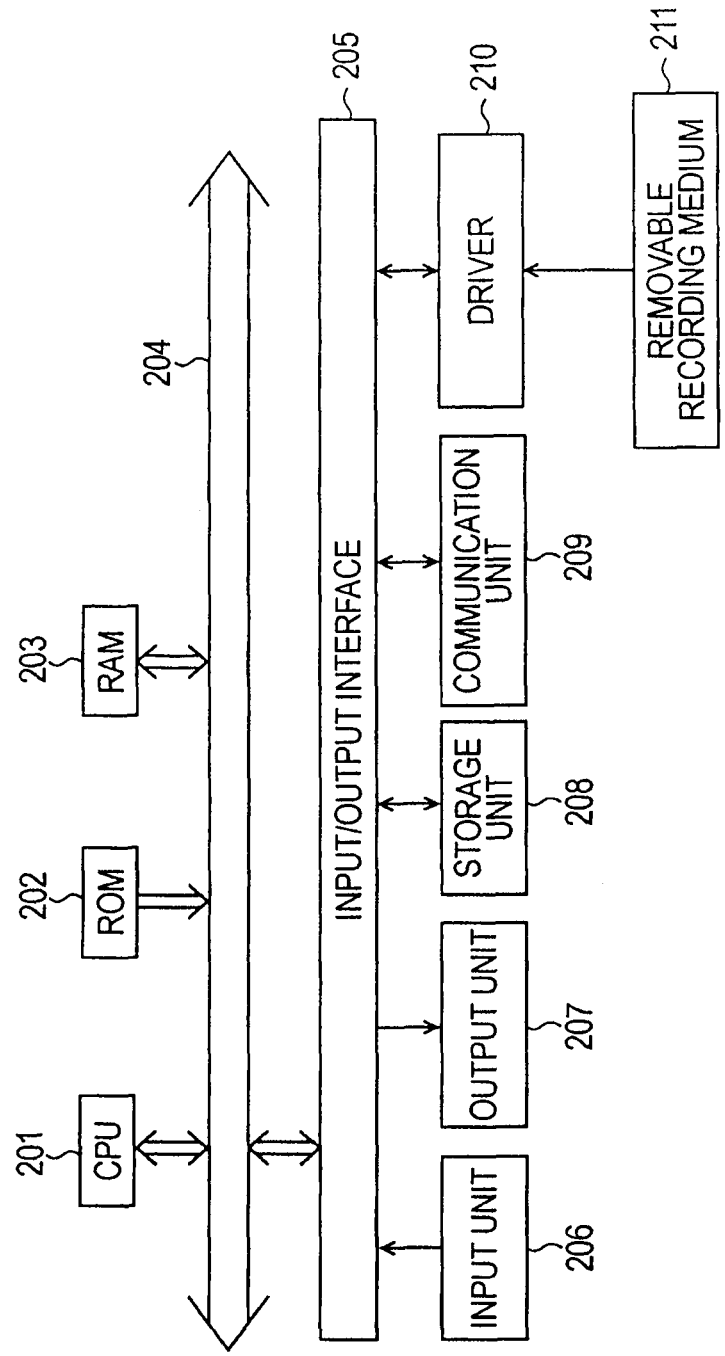
FIG. 15 is a block diagram illustrating an example of all or a portion of hardware configuration of the image processing device to which the present invention is applied.

In this case, all of the image processing device 1 in FIG. 1 or a portion thereof (e.g. the imaging blur suppressing processing 13 and the like), all of the image processing device 101 in FIG. 11 or a portion thereof, all of the image processing device 102 in FIG. 12 or a portion thereof, all of the image processing device 112 in FIG. 13 or a portion thereof, and all of the image processing device 131 in FIG. 14 or a portion thereof, are configured with a computer such as that shown in FIG. 15, for example.

In FIG. 15, the CPU (Central Processing Unit) 201 executes various types of processing according to a program recorded in ROM (Read Only Memory) 202 or a program loaded in RAM (Random Access Memory) 203 from a storage unit 208. The data for the CPU 201 to execute various types of processing is stored as appropriate in the RAM 203.

The CPU 201, ROM 202, and RAM 203 are mutually connected via a bus 204. The bus 204 is also connected to an input/output interface 205. The input/output interface 205 is connected to an input unit 206 made up of a keyboard, mouse, and so forth, an output unit 207 made up of a display and so forth, a storage unit 208 made up of a hard disk and so forth, and a communication unit 209 made up of a modem, terminal adapter, and so forth. The communication unit 209 performs communication processing with other image processing devices via a network including the Internet. The input/output interface 205 is also connected to a driver 210 as suitable, a removable recording medium 311 made up of a magnetic disk, optical disk, magneto-optical-disk, or semiconductor memory and so forth is mounted thereto as appropriate, and a computer program read out therefrom is installed in the storage unit 208 as suitable.

In the case that the series of processing is to be executed by software, the program making up the software is installed from a network or recording medium into a computer built into dedicated hardware, or a general-use personal computer which can execute various types of functions by installing various types of programs.

A recording medium including such a program is not restricted to being made up of a removable recording medium (packaged media) 211 such as a magnetic disk (including floppy disk), optical disk (including CD-ROM (Compact Disk-Read Only Memory), DVD (Digital Versatile Disk), optical magnetic disk (including MD (Mini-Disk)), or semiconductor memory on which the program is recorded, which is distributed separately from the main device unit to provide users with the program, but is also made up of a ROM 202 on which the program is recorded or the hard disk included in the storage unit 208, which are provided to the users in a state of being built into the main device unit beforehand.

Note that with the present specification, the steps describing the program recorded on the recording medium include processing performed in a time-series manner along a sequence thereof, but is not necessarily restricted to processing in a time-series manger, and also includes processing to be executed in parallel or individually.

Also, as described above, with the present specification, the term "system" indicates the entirety of equipment configured of multiple processing devices or processing units.

Further, with the high frame rate converting processing executed in the above-described embodiments, the combination of the first frame rate (frame frequency) of the input video signal and the second frame rate (frame frequency) of the output video signal is not particularly restricted, and may be in an arbitrary combination thereof. Specifically for example, 60 (or 30) [Hz] can be employed as the first frame rate of the input video signal, and 120 [Hz] can be employed as the second frame rate of the output video signal. For example, 60 (or 30) [Hz] can be employed as the first frame rate of the input video signal, and 240 [Hz] can be employed as the second frame rate of the output video signal. Also, for example, 50 [Hz] corresponding to a PAL (Phase Alternation by Line) method can be employed as the first frame rate of the input video signal, and 100 [Hz] or 200 [Hz] can be employed as the second frame rate of the output video signal. Further, for example, 48 [Hz] corresponding to telecine can be employed as the first frame rate of the input video signal, and a predetermined frequency greater thereof can be employed as the second frame rate of the output video signal.

Note that by performing high frame rate converting processing with the above-described various embodiments as to the input video signal originating from a television method according to the related art, content according to the related art can be displayed with high quality.

The present system, method and computer program product can specifically be used when displaying images in non-stroboscopic display devices, in particular Liquid Crystal Display Panels (LCDs), Thin Film Transistor Displays (TFTs), Color Sequential Displays, Plasma Display Panels (PDPs), Digital Micro Mirror Devices or Organic Light Emitting Diode (OLED) displays.

The above description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention. It should be understood by those skilled in the art that various modifications, combinations, sub-combinations and alterations may occur depending on design requirements and other factors insofar as they are within the scope of the appended claims or the equivalents thereof.

The invention claimed is:

1. An image processing method to process a moving image, which is shot by a predetermined video shooting device, in increments of access units, imaging blur being represented by a corresponding low-pass filter showing the properties of imaging blur which occurs at the time that said moving image is shot with said video shooting device, comprising the steps of:
generating an inverse filter having inverse properties as to said low-pass filter; and
performing processing to apply said inverse filter to each of the access units to be processed,
wherein said step of generating an inverse filter includes applying an iterative algorithm in a frequency domain based on a blurred image gain function G, a point spread function H and iteratively calculated original image gain functions F.

2. The method according to claim 1, wherein said step of generating an inverse filter includes
applying a Fourier transformation to the low-pass filter thereby obtaining the point spread function,
generating by said iterative algorithm an inverse point spread function, and
applying an inverse Fourier transformation to the inverse point spread function to obtain said inverse filter.

3. The method according to claim 1, wherein the iterative algorithm is based on the Richardson-Lucy-algorithm.

4. The method according to claim 1, wherein the iterative algorithm includes the steps of
multiplying the point spread function H with a gain function Ft of the previous iteration step to obtain a first multiplication result M1, wherein in the first iteration cycle Ft corresponds to the blurred image gain function G,
multiplying the first multiplication result M1 with the point spread function H to obtain intermediate result G',
calculating a difference between G and G',
multiplying the point spread function H with the difference between G and G' thereby obtaining a second multiplication result M2,
adding the second multiplication result M2 to $F^{(t)}$ for obtaining $F^{(t+1)}$, and
repeating the previous steps thereby using $F^{(t+1)}$ as new $F^{(t)}$.

5. The method according to any of the preceding claims, wherein the iterative algorithm is based on the following expression $$\hat{F}^{(t+1)} = F^{(t)} + (G - G') \times H$$

$$G' = \hat{F}^{(t)} \times H \times H$$

$$\hat{F}^{(0)} = G \quad (4):$$

wherein H represents the point spread function, G represents the blurred image gain function, F represents the original image gain function and the index t represents the iteration cycle.

6. An image processing device to process a moving image, which is shot by a predetermined video shooting device, in increments of access units, imaging blur being represented by a corresponding low-pass filter showing the properties of imaging blur which occurs at the time that said moving image is shot with said video shooting device, comprising:

a reverse movement average filter generation unit configured to generate an inverse filter having inverse properties as to said low-pass filter, and an imaging blur suppressing processing unit configured to perform processing, via a processor, to apply said inverse filter to each of the access units to be processed, wherein said reverse movement average filter generation unit determines the inverse filter according to an iterative algorithm in the frequency domain based on a blurred image gain function G, a point spread function H and iteratively calculated original image gain functions F.

7. The device according to claim 6, wherein said reverse movement average filter generation unit includes a frequency conversion unit configured to apply a Fourier transformation to the low-pass filter thereby obtaining the point spread function, an inverse function generating unit configured to generate by said iterative algorithm an inverse point spread function, and a frequency reverse conversion unit configured to apply an inverse Fourier transformation to the inverse point spread function to obtain said inverse filter.

8. The device according to claim 6, wherein said inverse function generating unit is configured to multiply the point spread function H with a gain function Ft of the previous iteration step to obtain a first multiplication result M1, wherein in the first iteration cycle Ft corresponds to the blurred image gain function G, multiply the first multiplication result M1 with the point spread function H to obtain intermediate result G', calculate a difference between G and G', multiply the point spread function H with the difference between G and G' thereby obtaining a second multiplication result M2, add the second multiplication result M2 to $F^{(t)}$ for obtaining $F^{(t+1)}$, and repeat the previous steps thereby using $F^{(t+1)}$ as new $F^{(t)}$.

9. The device according to any of claims 6 to 8, wherein said inverse function generating unit is configured to base the iterative algorithm on the following expression $$\hat{F}^{(t+1)} = \hat{F}^{(t)} + (G - G') \times H$$

$$G' = \hat{F}^{(t)} \times H \times H$$

$$\hat{F}^{(0)} = G \quad (4):$$

wherein H represents the point spread function, G represents the blurred image gain function, F represents the original image gain function and the index t represents the iteration cycle.

10. An image processing device to process a moving image, which is shot by a predetermined video shooting device, in increments of access units, wherein imaging blur being represented by a corresponding low-pass filter showing the properties of imaging blur which occurs at the time that said moving image is shot with said video shooting device, comprising:

a reverse movement average filter generation means for generating an inverse filter having inverse properties as to said low-pass filter; and an imaging blur suppressing processing means for performing processing to apply said inverse filter to each of the access units to be processed, wherein said reverse movement average filter generation means determines the inverse filter according to an iterative algorithm in the frequency domain based on a blurred image gain function G, a point spread function H and iteratively calculated original image gain functions F.

11. A non-transitory computer readable medium storing computer-readable instructions thereon which when executed by a computer cause the computer to perform a method for processing a moving image, which is shot by a predetermined video shooting device, in increments of access units, imaging blur being represented by a corresponding low-pass filter showing the properties of imaging blur which occurs at the time that said moving image is shot with said video shooting device, said method comprising:

generating an inverse filter having inverse properties as to said low-pass filter; and performing processing to apply said inverse filter to each of the access units to be processed, wherein said step of generating an inverse filter includes an iterative algorithm in the frequency domain based on a blurred image gain function G, a point spread function H and iteratively calculated original image gain functions F.

* * * * *